United States Patent
Sun et al.

(10) Patent No.: US 9,130,225 B2
(45) Date of Patent: Sep. 8, 2015

(54) SEAWATER BATTERY OF DISSOLVED OXYGEN TYPE

(75) Inventors: Gongquan Sun, Dalian (CN); Erdong Wang, Dalian (CN); Shaohua Yang, Dalian (CN)

(73) Assignee: DALIAN INSTITUTE OF CHEMICAL PHYSICS, CHINESE ACADEMY OF SCIENCES, Dalian, Liaoning (CN)

( * ) Notice: Subject to any disclaimer, the term of this patent is extended or adjusted under 35 U.S.C. 154(b) by 213 days.

(21) Appl. No.: 13/989,807

(22) PCT Filed: Nov. 30, 2010

(86) PCT No.: PCT/CN2010/079288
§ 371 (c)(1),
(2), (4) Date: May 27, 2013

(87) PCT Pub. No.: WO2012/071707
PCT Pub. Date: Jun. 7, 2012

(65) Prior Publication Data
US 2013/0236763 A1  Sep. 12, 2013

(30) Foreign Application Priority Data
Nov. 29, 2010 (CN) .......................... 2010 1 0563787

(51) Int. Cl.
*H01M 6/34* (2006.01)

(52) U.S. Cl.
CPC ...................................... *H01M 6/34* (2013.01)

(58) Field of Classification Search
CPC ....................................................... H01M 6/34
See application file for complete search history.

(56) References Cited

U.S. PATENT DOCUMENTS

| | | | | |
|---|---|---|---|---|
| 4,628,420 A | * | 12/1986 | McArthur ...................... | 362/208 |
| 4,822,698 A | * | 4/1989 | Jackovitz et al. ............. | 429/453 |
| 5,405,717 A | * | 4/1995 | Hasvold ........................ | 429/119 |
| 5,427,871 A | * | 6/1995 | Garshol et al. ................ | 429/119 |

\* cited by examiner

*Primary Examiner* — Stewart Fraser
(74) *Attorney, Agent, or Firm* — Novick, Kim & Lee, PLLC; Allen Xue

(57) ABSTRACT

A seawater battery of dissolved oxygen type includes a battery frame (1), n pieces of metal anode plates (2), n pieces of inert cathode plates (3), current collectors and wires (5). The battery frame (1) is consisted of an upper base (6) and a lower base (7), wherein the upper base and the lower base are respectively consisted of an outer ring and a central fixing component. The fixing component is connected with and fixed to the outer ring by a connector, and n pieces of metal anode plates are inserted on the connector so as to construct a cylindrical or frustum-shaped structure. The inert cathode plates are inserted between the metal anode plates along radial direction of the outer ring, and are connected with and fixed to the outer ring and the fixing component of the upper base and the lower base. The metal anode plates are welded in series by wires constituting the anode of the battery and the inert cathode plates are welded in series by wires constituting the cathode of the battery.

10 Claims, 2 Drawing Sheets

SEAWATER BATTERY OF DISSOLVED OXYGEN TYPE

FIELD OF THE INVENTION

This invention related to chemical power sources, specifically a seawater battery of dissolved oxygen type used under seawater or saline water.

BACKGROUND OF THE INVENTION

Electronic equipment working in the sea or other saline waters, such as marine aids to navigation, hydro-meteorological buoys, underwater detectors, unlimited sensors and so on, need batteries to provide energy as power sources. The electrical equipment above requires battery with higher capacity and better stability. Conventional primary batteries, such as zinc-manganese, zinc-silver etc., have a higher price, but lower quantity/volume energy density and worse storage performance. If lead-acid, nickel metal hydride, or lithium ion secondary battery is used, on the one hand, the continuous using time underwater is limited by the rated capacity; on the other hand, it needs to be sealed in a pressure-resistant container while working in the deep sea, especially for the lithium-ion battery, which further increases the complexity of the system.

Seawater battery of dissolved oxygen is a kind of battery used underwater, which selects metal, such as magnesium, aluminum or the alloy as the anode reactant, oxygen as the oxidant, and seawater or saline water as the electrolyte. The advantages of such batteries are:

1. High energy density. As both of the oxidant and the electrolyte, except the metal anode, are provided by seawater directly, the theoretical energy density in quantity is up to hundreds of watts per kilogram.

2. Rich source of raw materials. Both magnesium and aluminum are rich in earth and low in price.

3. Perfect storage performance. Such battery is inactive when isolated with seawater or saline water. Thus it has a perfect storage performance with a period of time up to several years. However, the dissolved oxygen in seawater is used as oxidant in such a battery and its content is too low (only 0.3 $mol/m^3$), the cathode must be an open structure to ensure its contact with seawater. At the meanwhile, the enlarged cathode area can contribute a relatively large current for such battery.

In order to expand the cathode area of seawater battery, patent CN1543001A disclosed a divergent cathode structure with a magnesium rod in its central. But such structure can't guarantee the smooth flow of seawater throughout the internal battery completely, and the distance between the magnesium anode and the cathode is a little far, which increases the ionic resistance and further lowers the battery performance. Courtesy of Westinghouse Corporation in US disclosed that a circle cathode was placed around the cylindrical periphery of the magnesium anode to ensure the cathode full contact with seawater, while the problem of poor seawater circulation also exists in such structure. Besides, the volume of such battery is too large and the internal space is not fully utilized.

On the whole, the problems, such as small effective area of the electrode, low effective capacity, poor internal flow of seawater, lack of oxygen supply, being wound and polluted by the seawater bliss algae easily, etc., haven't been solved systematically for the battery systems used under seawater. Thus, an effective solution to the above problems is critical to the further application of such battery system used under seawater.

SUMMARY OF THE INVENTION

Against the deficiency of the technology in existence, this invention provides a new seawater battery of dissolved oxygen. Compared to conventional battery used under seawater, the battery of this invention has not only large effective electrode area, but also high effective capacity. Besides, the structure of this invention also ensures the smooth flow of seawater inside the battery, which is a way to solve the problem of insufficient supply of oxygen to the cathode to a certain extent. In the meanwhile, the designed protection network of this battery solves the problem of twine and contamination of algae in seawater to the battery.

To achieve the above object, the present invention employs the following embodiment to achieve.

A seawater battery of dissolved oxygen of this invention, comprising a battery frame, n pieces of metal anode plates, n pieces of inert cathode plates, current collectors and wires;

said battery frame is constituted by an upper base and a lower base, both of which are constituted by an outer ring and a central fixing component, the fixing component and outer ring are fixed together by connectors; said fixing component, said outer ring and said connectors are all made into plate-like structure; n said connectors are uniformly distributed along the radial direction on the circumference of the outer ring and are correspondingly set on the upper and the lower bases;

n≥2, n is a positive integer;

the number of said connectors on the upper base and the lower base is the same;

dented grooves are set correspondingly along the radial direction of the outer ring on the lower surface of connectors of upper base and the upper surface of connectors of lower base; n pieces of metal anode plates insert into those dented grooves, and one end of each metal plate inserts into a dented groove located in a connector of upper base, and the other end is into the corresponding dented groove located in the connector of lower base; said metal anode plates connect the upper and the lower base as a whole, and further construct a cylindrical or frustum-shaped structure; such design is benefit to the reduction of volume and enhancement of effective utilization space of the system;

n pieces of inert cathode plates are interposed along the radial direction of the outer ring between the adjacent metal anode plates; said metal anode plates and said inert cathode plates are alternately and uniformly arranged from the fixing component to the outer ring; gaps exist between the adjacent metal anode plates and inert cathode plates; thus, the effective electrode area is enlarged and the fluidity of the seawater in the interior of the battery is improved, both of which are benefit for the sufficient supply of oxygen to the battery cathode and further improves the effective capacity;

said inert cathode plates are connected to the fixing component and the outer ring of the upper and the lower bases, respectively; said current collectors are placed on the sides of the inert cathode plates, which further enhances the current collecting ability and benefits the reduction of the system energy loss;

said metal anode plates are welded in series by wires constituting the anode of the battery and said inert cathode plates are welded in series by wires constituting the cathode of the battery.

Two pieces of rigid clamping plates are provided at both axial sides of each said inert cathode plate;

corresponding slots are provided in the fixing components and the outer rings of the upper and the lower bases and the locations between connectors;

said clamping plates at both ends of the said inert cathode plates insert into the said corresponding slots in fixing components or the outer rings of the upper and lower bases.

Such design of the clamping plates and the slots, on the one hand, improves the rigidity of the said cathode and further avoids damage caused by the seawater attack; on the other hand, it is also beneficial to fix the said cathode and in the meanwhile avoid the perforation in traditional fixed approach.

Thermoplastic material, such as ABS, PVC, PC, PE, POM, PP, PS, PA, PTFE, PPS, PEEK or PAI, is selected as the raw material of said clamping plates; rigid metal materials can also be chosen as said clamping plates, and at the same time used as said metal current collectors.

Protection networks, made of seawater-resistant and insulating material, are not only used to wrap around side surface of said cylindrical or frustum-shaped battery, but also used to cover said gaps surrounded by said connectors on the upper and lower bases.

Such design prevents the battery from twining or polluting by the bliss algae in the seawater adequately, which enhanced the durability and service life of the battery system.

Said fixing components on the upper and lower bases have the same shape and size; said metal anode plates are locked vertically to the dented grooves as detachable structure or inserted vertically into the dented grooves as pluggable structure; said metal plates have a replaceable structure; sealing rings are set in the dented grooves between said metal anode plates and connectors to ensure firmly fixed.

Said battery frame is made of thermoplastic material, such as ABS, PVC, PC, PE, POM, PP, PS, PA, PTFE, PPS, PEEK or PAI, through injection molding.

Said inert cathode plates are made of carbon felt, carbon plate, copper alloy or carbon steel; or they are made of composite materials with one of the above as the base material; said metal plates are made from Al, Mg, Li, Zn, or alloy made by two or more metals above.

Said current collectors are conductive metal sheets; said wires are seawater-resistant or wrapped by an insulating, seawater-resistant material;

when said metal anode plates and said inert cathode plates are welded in series respectively, the welding points are wrapped by insulating, seawater-resistant material.

Accommodating grooves for wires are set in the fixing components and/or outer ring of the upper or lower base; said wires are laid in the said accommodating grooves, which are sealed by insulating, seawater-resistant material to reduce the risk of failure in series, avoid short circuit and ensure the effective discharge of the battery.

Saline water or water containing NaCl from lake or river can be chosen as electrolyte instead of seawater.

Compared with conventional batteries used under seawater, the seawater battery of dissolved oxygen of this invention has apparent advantages as below:

1. The compact cylindrical or frustum-shaped structure of the battery reduce the volume, enhance the effective utilization of the internal space of the battery system;

2. The metal plates and cathode plates arranged alternately and uniformly from the fixing component to the outer ring not only enlarge the effective electrode area, but also improve the fluidity of the seawater inside the battery, which is benefit for the sufficient supply of oxygen to the cathode and further improves the effective capacity of the battery.

3. Accommodating Groove for wires on the fixing component and/or the outer ring of the upper or lower base and the insulating package for the welding point guarantee the effective connection of the single battery in series and in the meanwhile avoids short-circuit.

4. The protection network of this invention, made by insulating seawater-resistant material, prevents the battery from twining or polluting by the bliss algae in the seawater, which enhances the durability and service life of the battery system.

1. Battery frame,
2. Magnesium Anode Plates,
3. Carbon Felt Inert Cathode Plates,
4. Stainless Steel Sheets,
5. Wires,
6. Upper Base,
7. Lower Base,
8. Outer Ring,
9. Fixing component,
10. Connector,
11. Dented groove,
12. Clamping Plates,
13. Slot,
14. Protection Network,
15. Accommodating Groove for Wires.

EMBODIMENTS

Figure 1:
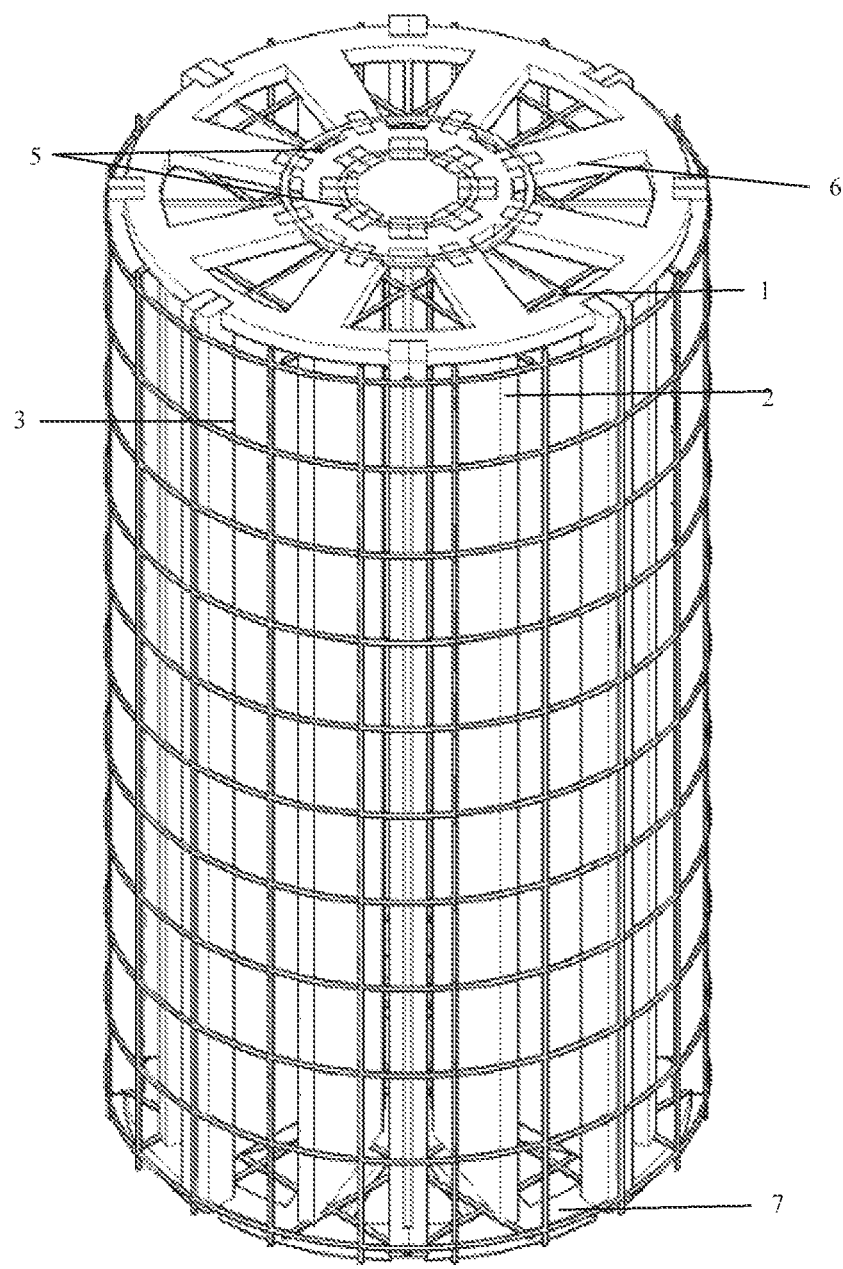
FIG. 1 is an overall view of the seawater battery of dissolved oxygen according to this invention.
Figure 2:
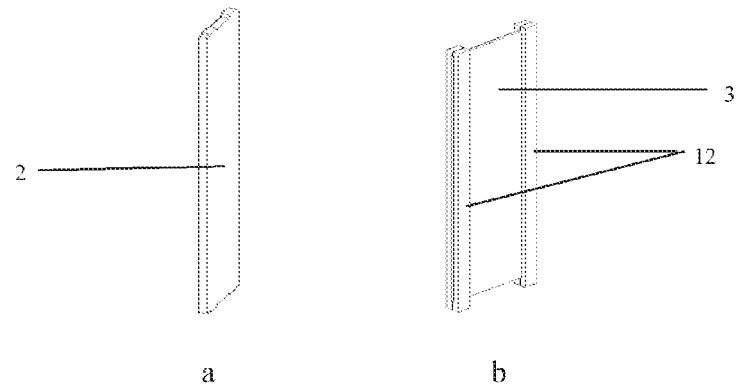
FIG. 2 is an enlarged section view of (a) a metal anode plate and (b) an inert cathode plate of the seawater battery of dissolved oxygen shown in FIG. 1.
Figure 3:
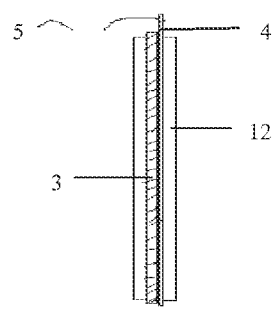
FIG. 3 is a view of current collectors in detail illustrating the way adopted to collect current according to this invention.
Figure 4:
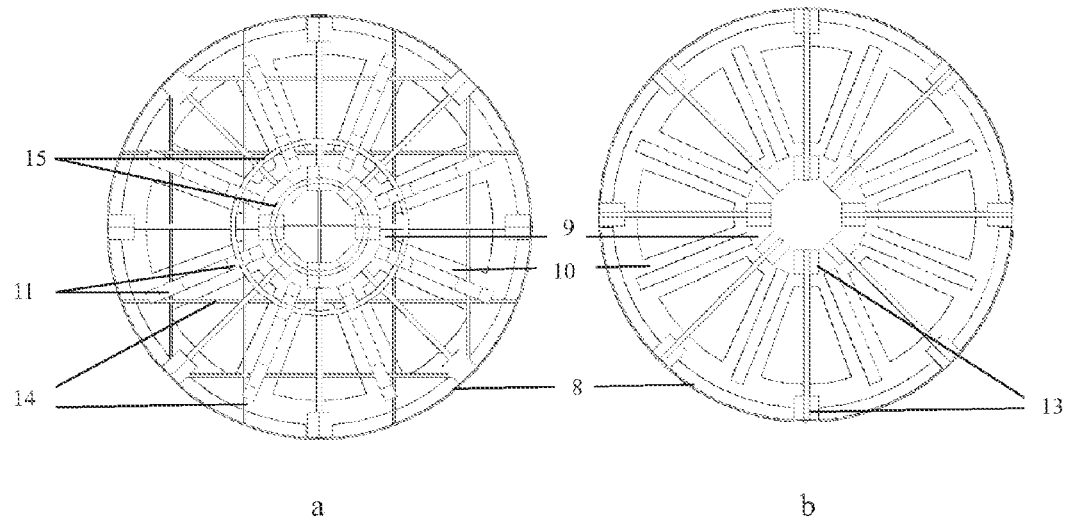
FIG. 4 is a view of (a) the upper base and (b) the lower base without protection network in detail according to this invention.

A seawater battery of dissolved oxygen of this invention as shown in FIG. 1-3 consisted an ABS battery frame 1, magnesium anode plates 2, carbon felt inert cathode plates 3, stainless steel sheet 4 as current collectors and wires 5.

The battery frame 1 was constructed by an upper base 6 and a lower base 7, both of which were constituted by an outer ring 8 and a fixing component 9 in the central to fix the said outer ring 8. The outer and the internal diameter of the outer rings 8 were 20 cm and 18 cm, and the outer and the internal diameter of the fixing component were 5.5 cm and 4 cm. The said fixing component 9 and the outer ring 8 were connected by connectors 10. The said fixing component 9, outer ring 8 and connectors 10 were all plate-like, and the thickness was 0.8 cm. Both of the upper base 6 and the lower base 7 had eight connectors 10 and all the connectors 10 were set uniformly on the circumference of the outer ring 8. Each two adjacent connectors had a angle of 45°.

Dented grooves 11 were opened on both the lower surface of the connectors 10 for the upper base 6 and the upper surface of the connectors 10 for the lower base 7. One ends of the eight magnesium anode plates 2 were inserted into the dented grooves 11 on the upper base connectors 10, and the other ends were inserted into the corresponding dented grooves 11 on the upper base connectors 10. Therefore, the upper base 6 and the lower base 7 were connected by the magnesium anode plates 2 to construct a cylindrical structure.

Eight carbon felts inert cathode plates 3 were interposed along the radial direction of the outer ring 8, between the adjacent magnesium anode plates 2. Seeing along the axial direction, magnesium anode plates 2 and carbon felts inert cathode plates 3 were alternately and uniformly arranged along the radial direction from the fixing component 9 to the outer ring 8.

And they were also fixed to the fixing components 9 and the outer ring 8 of the upper and lower bases.

Steel sheets 4 as current collectors were set on the side of the carbon felt 3.

Eight magnesium plates 2 were welded in series by wires 5, constituting the anode of the battery.

Other eight carbon felts 3 were also welded in series by wires 5, constituting the cathode of the battery.

Two pieces PVC clamping plates 12 were provided at both sides of the carbon felt 3. Both axial sides of each carbon felt 3 were fixed to the corresponding clamping plates 12. Slots 13 were provided on the fixing components 9 and the outer rings 8 of the upper and lower bases, and the location between connectors 10.

Both ends of the clamping plates 12 were inserted into the said slots 13 on the fixing component 9 or the outer ring 8.

Protection network 14, made of insulating seawater-resistant material, were not only used to wrap around the side surface of the cylindrical battery, but also used to cover the outer surface of the upper and lower bases.

The magnesium anode plates 2 were inserted vertically into the dented groove 11 as pluggable structure. Said magnesium anode plates 2 had a replaceable structure. A sealing ring was set into the dented groove 11 to ensure the fixation of magnesium anode plates 2.

Wires 5 were wrapped by insulating material, which was also corrosion resistant from seawater.

When the anodes and cathodes in a seawater battery welded in series, the welding points were wrapped by an insulating material, which was also corrosion resistant from seawater.

Accommodating groove for wires 15 was set on the fixing component 9 and the outer ring 8 of the upper base 6. Wires 5 were laid in the said accommodating grooves 15, which was sealed by ABS material.

We claim:

1. A seawater battery of dissolved oxygen, comprising:
   a battery frame, n metal anode plates, n inert cathode plates, current collectors and wires, wherein each of the current collectors is attached to a cathode plate, and n is an integer greater than 2,
   said battery frame comprises an upper base and a lower base, each of the upper base and the lower base has an outer ring and a fixing component disposed about the center of the outer ring,
   wherein the fixing component and the outer ring are connected together by a plurality of connectors, and said connectors are uniformly distributed along the radial direction toward the outer ring,
   wherein a number of connectors connect the fixing component with the upper base and a same number of connectors connect the fixing component with the lower base
   wherein each connector has a groove so that a groove in the connector disposed on the upper base and a groove in a corresponding connector disposed on the lower base paired together to receive a metal anode plate,
   wherein each inert cathode plate is interposed along the radial direction toward the outer ring between two adjacent metal anode plates so that said metal anode plates and said inert cathode plates are alternately and uniformly arranged from the fixing component toward the outer ring;
   wherein said metal anode plates are connected in series to form an anode of the battery and said inert cathode plates are connected in series to form a cathode of the battery.

2. The seawater battery of dissolved oxygen of claim 1, wherein two rigid clamping plates are provided at both axial sides of each of said inert cathode plate, corresponding slots are provided in the fixing components and the outer rings of the upper and the lower bases and the locations between connectors; said clamping plates at both ends of the said inert cathode plates insert into the said corresponding slots in the fixing components or the outer rings of the upper and lower bases.

3. The seawater battery of dissolved oxygen of claim 2, wherein the clamping plates are made from a thermoplastic material chosen from ABS, PVC, PC, PE, POM, PP, PS, PA, PTFE, PPS, PEEK or PAI, or are made from a metal.

4. The seawater battery of dissolved oxygen of claim 1, wherein the battery is encased in a protective mesh.

5. The seawater battery of dissolved oxygen of claim 1, wherein said fixing components on the upper and lower bases are identical in shape and size; said metal anode plates are locked vertically to the grooves as detachable structures or inserted vertically into the grooves as pluggable structures; said metal plates have a replaceable structures;
   sealing rings are set in the grooves between said metal anode plates and connectors.

6. The seawater battery of dissolved oxygen of claim 1, wherein said battery frame is made from a thermoplastic material chosen from ABS, PVC, PC, PE, POM, PP, PS, PA, PTFE, PPS, PEEK or PAI.

7. The seawater battery of dissolved oxygen of claim 1, wherein said inert cathode plates are made of carbon felt, carbon plate, copper alloy or carbon steel; or are made of composite materials comprising carbon felt, carbon plate, copper alloy or carbon steel as a base material; and said metal plates are made from Al, Mg, Li, Zn, or alloy thereof.

8. The seawater battery of dissolved oxygen of claim 1, wherein said current collectors are electrically conductive metal sheets.

9. The seawater battery of dissolved oxygen of claim 1, wherein accommodating grooves for wires are set in the fixing components and/or outer ring of the upper or lower base.

10. The seawater battery of dissolved oxygen of claim 1, wherein an electrolyte is chosen from seawater, saline water or water containing NaCl.

* * * * *